United States Patent
Wijk

(10) Patent No.: US 11,386,530 B2
(45) Date of Patent: Jul. 12, 2022

(54) DIGITAL FILTER FOR TURBULENCE REDUCTION AND GAS DETECTION IN THERMAL IMAGES

(71) Applicant: FLIR Systems AB, Täby (SE)

(72) Inventor: Jonas Wijk, Täby (SE)

(73) Assignee: FLIR Systems AB, Täby (SE)

( * ) Notice: Subject to any disclaimer, the term of this patent is extended or adjusted under 35 U.S.C. 154(b) by 0 days.

(21) Appl. No.: 17/178,220

(22) Filed: Feb. 17, 2021

(65) Prior Publication Data

US 2021/0264569 A1    Aug. 26, 2021

Related U.S. Application Data

(60) Provisional application No. 62/982,004, filed on Feb. 26, 2020.

(51) Int. Cl.
| | |
|---|---|
| *G06T 5/00* | (2006.01) |
| *H04N 5/33* | (2006.01) |
| *G06T 7/00* | (2017.01) |
| *C10G 9/20* | (2006.01) |

(52) U.S. Cl.
CPC .............. *G06T 5/002* (2013.01); *C10G 9/206* (2013.01); *G06T 7/0004* (2013.01); *H04N 5/33* (2013.01); *G06T 2207/10048* (2013.01); *G06T 2207/20182* (2013.01); *G06T 2207/30164* (2013.01)

(58) Field of Classification Search
None
See application file for complete search history.

(56) References Cited

U.S. PATENT DOCUMENTS

| 4,539,588 A * | 9/1985 | Ariessohn | G01J 5/051 250/342 |
|---|---|---|---|
| RE33,857 E * | 3/1992 | Ariessohn | G01J 5/02 250/342 |
| 8,896,702 B2 * | 11/2014 | Wu | H04N 5/33 348/164 |
| 9,324,138 B2 * | 4/2016 | Olsen | G06T 5/009 |
| 10,416,076 B2 | 9/2019 | Sandsten et al. | |
| 10,422,741 B2 | 9/2019 | Sandsten et al. | |

(Continued)

FOREIGN PATENT DOCUMENTS

| BR | 102012009322 B1 * | 1/2020 | |
|---|---|---|---|
| CA | 3009558 A1 * | 12/2018 | C01B 3/24 |

(Continued)

*Primary Examiner* — Stefan Gadomski
(74) *Attorney, Agent, or Firm* — Haynes and Boone, LLP

(57) ABSTRACT

Various techniques are provided for removing turbulent gases from thermal images of high temperature scenes and for detecting gas leaks. In one example, a method includes receiving a plurality of thermal images captured of a scene comprising a furnace tube and combustion gas exhibiting higher temperatures than the furnace tube. Each thermal image comprises a plurality of pixels each having an associated pixel value. The method also includes applying a digital filter to the thermal images to generate a processed thermal image. Each pixel of the processed thermal image has an associated minimum pixel value determined from corresponding pixels of the thermal images to remove the higher temperature combustion gas from the processed thermal image. Additional methods and systems are also provided.

20 Claims, 8 Drawing Sheets

(56) References Cited

U.S. PATENT DOCUMENTS

| | | | |
|---|---|---|---|
| 10,735,680 B2* | 8/2020 | Kawai | H04N 5/33 |
| 2004/0052424 A1* | 3/2004 | Kokemohr | H04N 1/60 |
| | | | 382/254 |
| 2006/0049352 A1* | 3/2006 | Irani | G01J 5/08 |
| | | | 250/339.02 |
| 2006/0219920 A1* | 10/2006 | Wijk | H04N 5/33 |
| | | | 348/E5.079 |
| 2006/0238741 A1* | 10/2006 | Ninomiya | G01M 3/38 |
| | | | 382/106 |
| 2008/0237466 A1* | 10/2008 | Key | G01J 5/0088 |
| | | | 382/141 |
| 2008/0298426 A1* | 12/2008 | Koschack | F23M 5/08 |
| | | | 374/7 |
| 2009/0147277 A1* | 6/2009 | Oh | B41J 2/36 |
| | | | 358/1.9 |
| 2009/0192794 A1* | 7/2009 | Akamatsu | G10L 25/48 |
| | | | 704/230 |
| 2011/0113993 A1* | 5/2011 | Esmaili | F23N 1/002 |
| | | | 110/190 |
| 2011/0122251 A1* | 5/2011 | Schmidt | G06V 10/143 |
| | | | 348/E5.09 |
| 2013/0041614 A1* | 2/2013 | Shepard | F01D 5/147 |
| | | | 374/45 |
| 2013/0113939 A1* | 5/2013 | Strandemar | H04N 5/332 |
| | | | 348/E5.09 |
| 2014/0184781 A1* | 7/2014 | Au | G06T 7/33 |
| | | | 348/83 |
| 2016/0080664 A1* | 3/2016 | Henry | H04N 5/232933 |
| | | | 348/164 |
| 2016/0343118 A1* | 11/2016 | Olsen | G06T 5/50 |
| 2016/0373662 A1* | 12/2016 | Olsen | B64D 47/08 |
| 2017/0284874 A1* | 10/2017 | Zhao | B01J 19/2415 |
| 2017/0294013 A1* | 10/2017 | Sundaresan | G06V 10/44 |
| 2018/0011009 A1* | 1/2018 | Sandsten | G01N 21/314 |
| 2018/0266944 A1* | 9/2018 | Waxman | G01J 3/2823 |
| 2018/0335380 A1* | 11/2018 | Schmidt | H04N 5/272 |
| 2018/0353158 A1* | 12/2018 | Frinking | G16H 50/30 |
| 2018/0364185 A1* | 12/2018 | Asano | G01N 21/3504 |
| 2019/0003772 A1* | 1/2019 | Esmaili | F27D 21/02 |
| 2019/0014300 A1* | 1/2019 | Henry | H04N 9/646 |
| 2019/0026875 A1* | 1/2019 | Yuan | G06T 5/50 |
| 2019/0113414 A1* | 4/2019 | Tsuzuki | G01M 3/04 |
| 2019/0145891 A1* | 5/2019 | Waxman | G01M 3/38 |
| | | | 356/409 |
| 2019/0340914 A1* | 11/2019 | Israelsen | G08B 21/182 |
| 2020/0118273 A1* | 4/2020 | Asano | G01M 3/04 |
| 2020/0195818 A1* | 6/2020 | Li | H04N 5/2258 |
| 2021/0049789 A1* | 2/2021 | Bonn | G01J 5/0859 |
| 2021/0218909 A1* | 7/2021 | Schmidt | G01J 5/0265 |
| 2022/0048767 A1* | 2/2022 | Cousins | B01J 19/2415 |

FOREIGN PATENT DOCUMENTS

| | | | | |
|---|---|---|---|---|
| CN | 201607278 U | * | 10/2010 | |
| CN | 102798294 | | 11/2012 | |
| CN | 103808412 A | * | 5/2014 | |
| CN | 106404177 A | * | 2/2017 | G01J 5/00 |
| CN | 106949972 A | * | 7/2017 | G01J 5/00 |
| CN | 106970542 B | * | 6/2019 | C10G 9/16 |
| JP | 2006-018658 | | 1/2006 | |
| KR | 10-2008-0065833 | | 7/2008 | |
| KR | 10-2010-0028399 | | 3/2010 | |
| KR | 20180101748 A | * | 9/2018 | |
| KR | 101947256 B1 | * | 2/2019 | |
| WO | WO-9928729 A1 | * | 6/1999 | G01J 3/02 |
| WO | WO-2017168838 A1 | * | 10/2017 | C10J 3/46 |

\* cited by examiner

DIGITAL FILTER FOR TURBULENCE REDUCTION AND GAS DETECTION IN THERMAL IMAGES

CROSS-REFERENCE TO RELATED APPLICATIONS

This patent application claims priority to and the benefit of U.S. Provisional Patent Application No. 62/982,004 filed Feb. 26, 2020 and entitled "DIGITAL FILTER FOR TURBULENCE REDUCTION AND GAS DETECTION" which is hereby incorporated by reference in its entirety.

TECHNICAL FIELD

The present invention relates generally to improved thermal imaging and, more particularly, to thermal imaging applied to the monitoring of furnace tubes and gas detection.

BACKGROUND

Oil-refining furnaces typically employ tubes that are heated to temperatures in excess of 400 degrees Celsius. Crude oil is pumped through the furnace tubes and heated as it flows therethrough during a refining process. In such implementations, it is critical to maintain the furnace tubes within a narrow range of temperatures. For example, an excess temperature of 50 degrees Celsius on the surface of a furnace tube may reduce the tube's working life from 25 years possibly down to as little as 5 years. Conversely, a surface temperature that is too low may reduce the efficiency of, and consequently the throughput of, the oil refinery.

Conventional techniques for monitoring the temperature of furnace tubes are generally limited and sometimes problematic. For example, temperature sensors such as thermocouples are highly localized. As a result, such implementations may be unable to provide comprehensive temperature measurements over a large network of furnace tubes. Indeed, unless a particular surface of a furnace tube is in direct proximity to a temperature sensor, operators of the oil refinery may be completely unaware if that surface exhibits abnormally high or low temperatures.

Although thermal imaging systems may sometimes be used for monitoring, conventional thermal imaging systems are generally unable to provide consistent and repeatable measurements of furnace tube temperatures due to the interference of combustion gases within the furnace. The gases flow through the furnace with a high degree of turbulence and thus may obscure various tube surfaces in an unpredictable manner. In this regard, conventional thermal images may provide temperatures of only unpredictable portions of the furnace tubes and thus still fail to provide comprehensive temperature measurements. Moreover, because the gases are typically at different temperatures than the furnace tubes, an undiscerning user may in some cases incorrectly interpret temperature measurements of the gases as temperature measurements of the tubes.

SUMMARY

Various techniques are disclosed to provide for improved monitoring of furnace tubes through application of a digital filter to captured thermal images. For example, a set of thermal images may be captured while turbulent gases are flowing in proximity to furnace tubes. The captured thermal images may then be optionally stabilized and/or tracked. A processed thermal image may be generated using minimum pixel values corresponding to the lowest temperatures measured at each pixel from the set of thermal images. As a result, hotter turbulent gases may be filtered out to reveal the temperatures of the furnace tubes. Additional techniques are provided for detecting gas leaks as further discussed herein.

In one embodiment, a method includes receiving a plurality of thermal images captured of a scene comprising a furnace tube and combustion gas exhibiting a higher temperature than the furnace tube, wherein each thermal image comprises a plurality of pixels each having an associated pixel value; and applying a digital filter to the thermal images to generate a processed thermal image, wherein each pixel of the processed thermal image has an associated minimum pixel value determined from corresponding pixels of the thermal images to remove the higher temperature combustion gas from the processed thermal image.

In another embodiment, a system includes a thermal imager configured to capture a plurality of thermal images of a scene comprising a furnace tube and combustion gas exhibiting a higher temperature than the furnace tube, wherein each thermal image comprises a plurality of pixels each having an associated pixel value; and a logic device configured to: apply a digital filter to the thermal images to generate a processed thermal image, wherein each pixel of the processed thermal image has an associated minimum pixel value determined from corresponding pixels of the thermal images to remove the higher temperature combustion gas from the processed thermal image.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
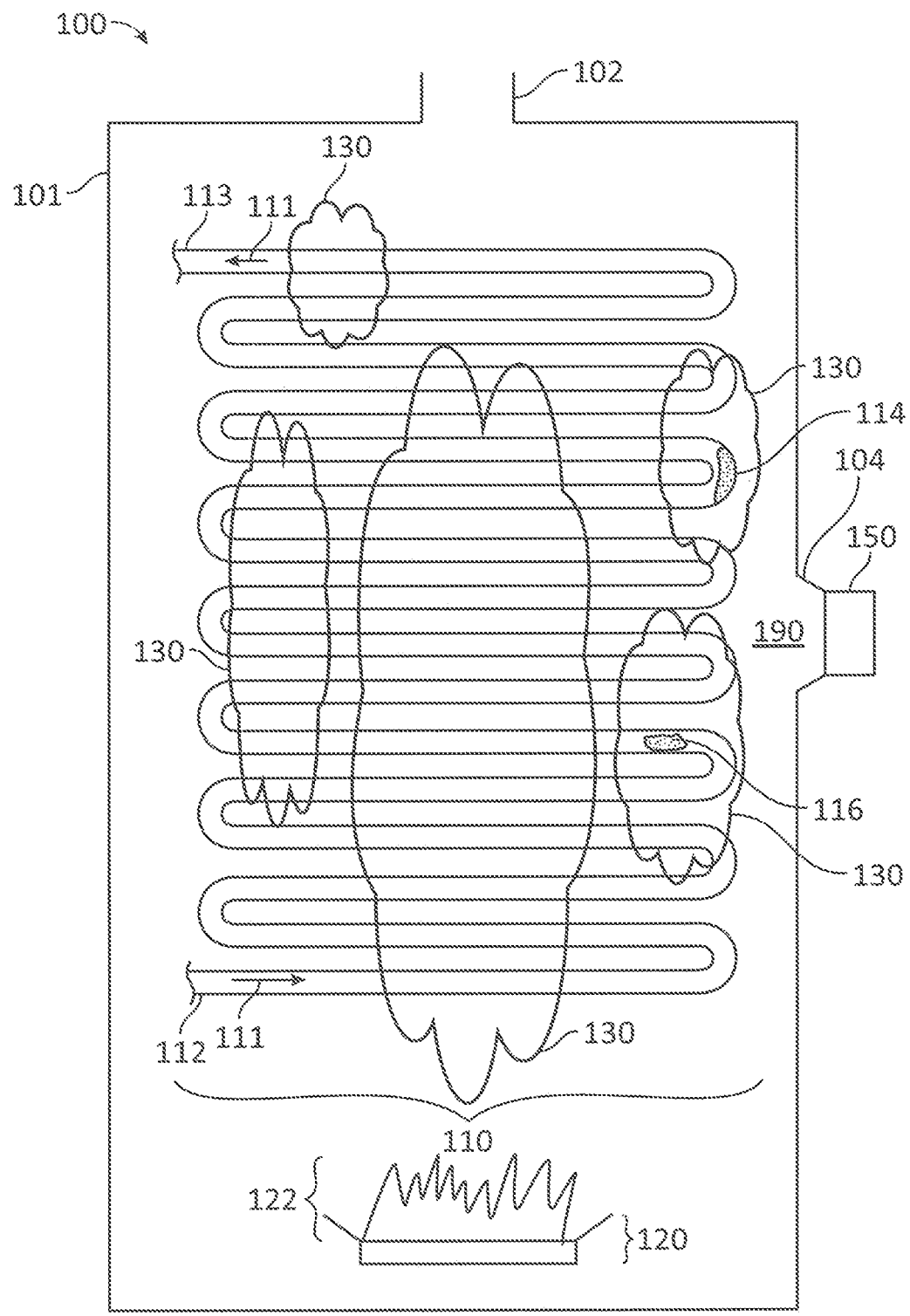
FIG. 1 illustrates a furnace with an imaging system in accordance with an embodiment of the disclosure.

FIG. 1 illustrates a furnace 100 with an imaging system 150 in accordance with an embodiment of the disclosure. Furnace 100 may include enclosure 101 with furnace tubes 110 disposed therein and arranged in a network to provide a path for crude oil 111 to pass therethrough. For example, crude oil may be pumped from an inlet portion 112 to an outlet portion 113 by one or more pumps or other appropriate apparatus (not shown). Imaging system 150 is positioned to capture thermal images of furnace tubes 110 through an opening 104 (e.g., an aperture, a door, and/or other access location) in enclosure 101.

Furnace 100 further includes one or more burners 120 which heat furnace tubes 110 and consequently also heat the crude oil 111 passing therethrough. In some embodiments, burners 120 perform combustion of various fuels such as coal, gas, or other types. This combustion generates heat, flames 122, and various gases 130 (e.g., including combustion gases and vapors) within enclosure 101. In some embodiments, furnace tubes 110 may be heated to approximately 400 degrees Celsius or higher during normal operation of furnace 100. In some embodiments, temperatures in excess of approximately 450 degrees Celsius may be outside normal operation and may be associated with temperature abnormalities resulting from coking, scaling, and/or other problems associated with furnace tubes 110.

In some embodiments, gases 130 (e.g., illustrated as several gas plumes) may flow from burners 120 out through a vent 102. However, gases 130 will generally flow in a highly turbulent and unpredictable manner. For example, gases 130 may exist as gas plumes that are temporarily positioned in front of various surfaces of furnace tubes 110 as shown in FIG. 1. Moreover, gases 130 will generally exhibit higher temperatures than tubes 110. As a result, thermal images captured by imaging system 150 of an interior portion of furnace 100 may provide only a partial view of furnace tubes 110. In this regard, the higher temperatures of gases 130 will obscure the lower temperatures of the portions of furnace tubes 110 in thermal images captured by imaging system 150.

As gases 130 flow unpredictably through furnace 100, their locations can shift as imaging system 150 captures additional thermal images. For example, successively captured thermal images may result in different portions of tubes 110 being exposed and obscured as gases 130 expand, contract, translate, and/or otherwise move.

For example, FIGS. 2A-2D illustrate thermal images 220-223 captured of furnace tubes 110 at different times. Thermal images 220-223 include a plurality of pixels disposed at corresponding pixel locations arranged in rows and columns, with each pixel having an associated pixel value corresponding to a temperature of the pixel in the imaged scene.

Figure 2A:
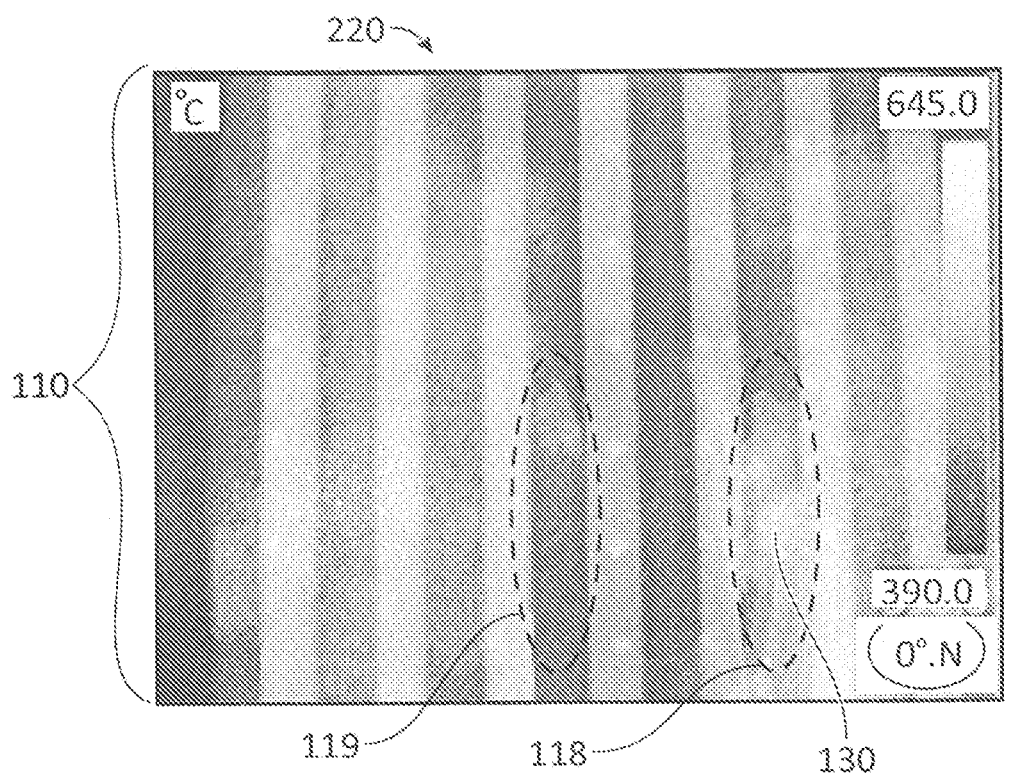
FIGS. 2A-2E illustrate several thermal images in accordance with embodiments of the disclosure.

In FIG. 2A, a surface 118 of furnace tubes 110 is significantly obscured by the presence of a higher temperature gas 130, while an additional surface 119 of furnace tubes 110 is not significantly obscured and therefore is viewable in thermal image 220. Accordingly, pixels in thermal image 220 associated with surface 118 will exhibit pixel values mostly associated with gas 130, but not the surface 118 itself. Meanwhile, pixels in thermal image 220 associated with surface 119 will indeed exhibit pixel values mostly associated with surface 119. As a result, the temperature of surface 119 can be determined using thermal image 220 alone, but the temperature of surface 118 cannot.

Figure 2B:
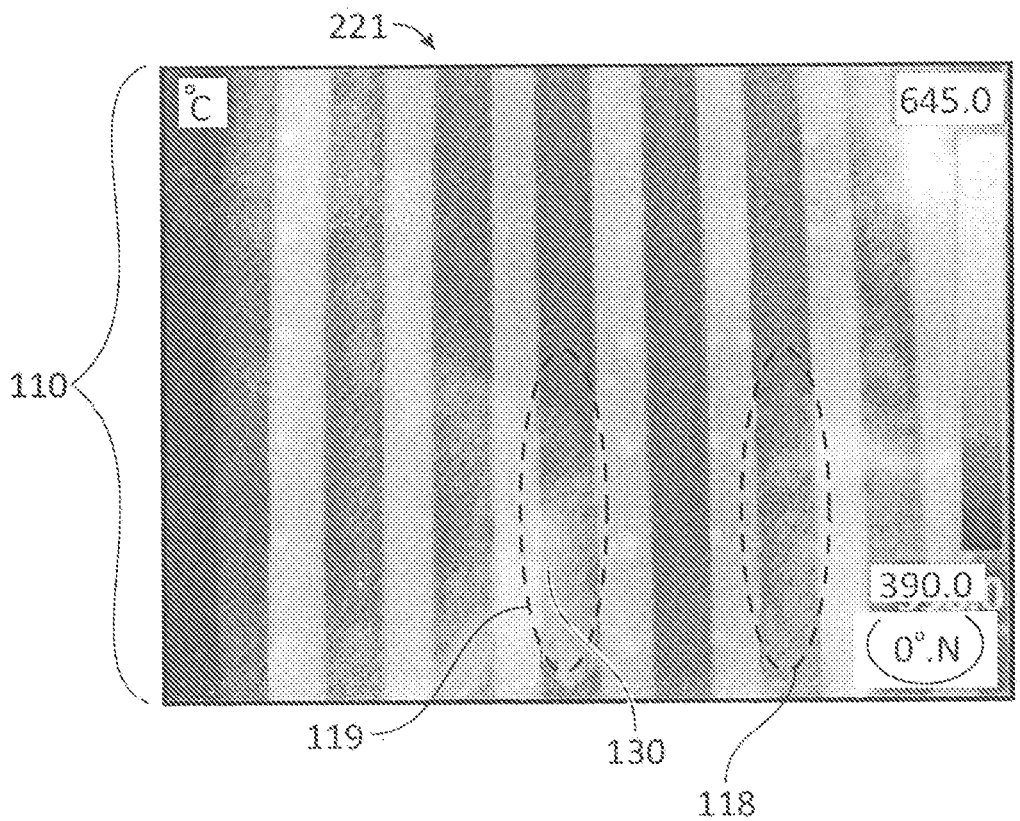

In FIG. 2B, surface 118 is no longer significantly obscured by gas 130 and therefore has become mostly viewable, while surface 119 has become significantly obscured by gas 130. Accordingly, pixels in thermal image 221 associated with surface 119 will exhibit pixel values mostly associated with gas 130, but not the surface 119 itself. Meanwhile, pixels in thermal image 221 associated with surface 118 will indeed exhibit pixel values mostly associated with surface 118. As a result, the temperature of surface 118 can be determined using thermal image 221 alone, but the temperature of surface 119 cannot.

Figure 2C:
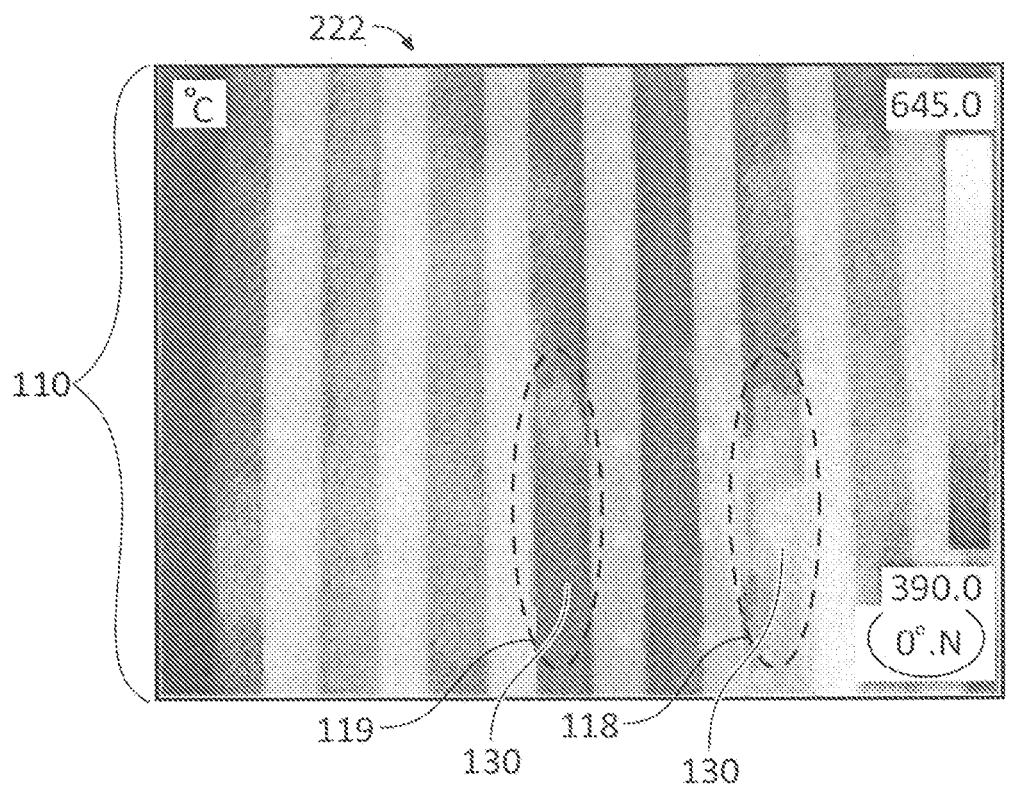
Figure 2D:
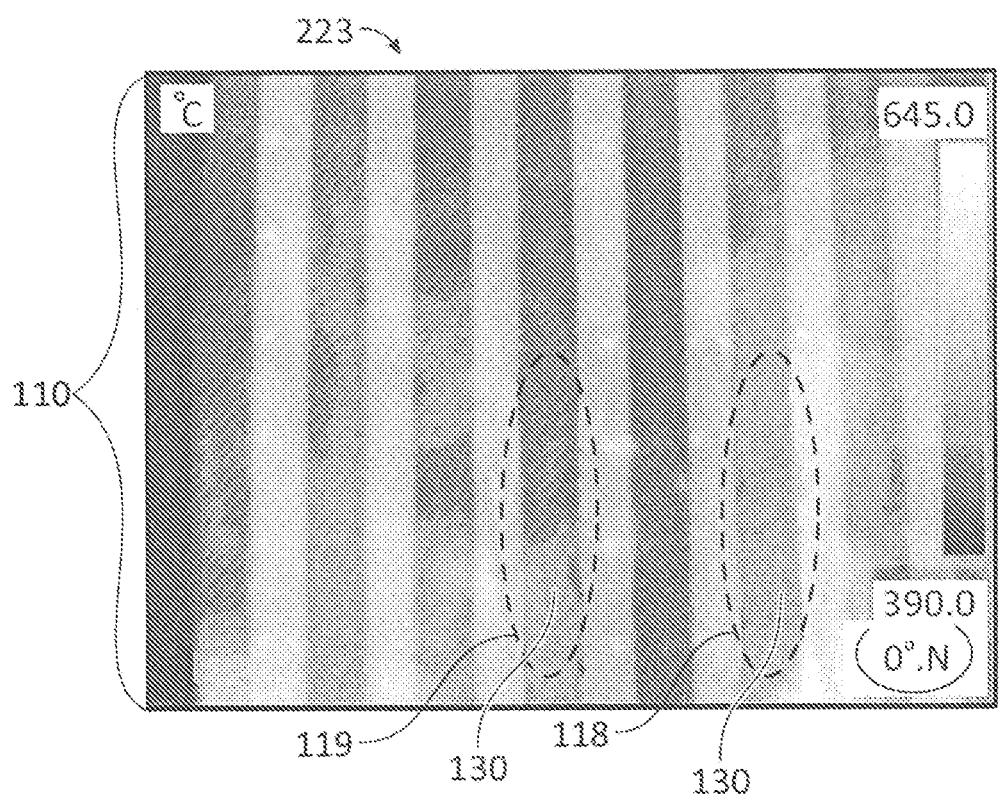

In FIGS. 2C and 2D, surfaces 118 and 119 are both at least partially obscured by gas 130. As such, pixels in thermal images 222 and 223 associated with surfaces 118 and 119 will exhibit pixel values associated with a mix of gas 130 and surfaces 118 and 119.

Moreover, a user viewing images 220-223 in realtime or rapid succession may have difficulty ascertaining meaningful temperature measurements of surfaces 118 and 119 due to the turbulent nature of gas 130. For example, the unpredictable movement of gas 130 may cause rapid fluctuations in the temperatures provided by captured thermal images such that the user may be unable to discern the actual temperature of surfaces 118 and 119. As a result, the user may be forced to repeatedly select and review thermal images captured at random times in the hope that surfaces 118 and 119 and/or other portions of furnace tubes 110 of interest to the user might be viewable in one of the thermal images. Such a trial and error approach is highly inefficient, unpredictable, and does not lend itself to reliable temperature measurement of critical furnace systems.

Figure 2E:
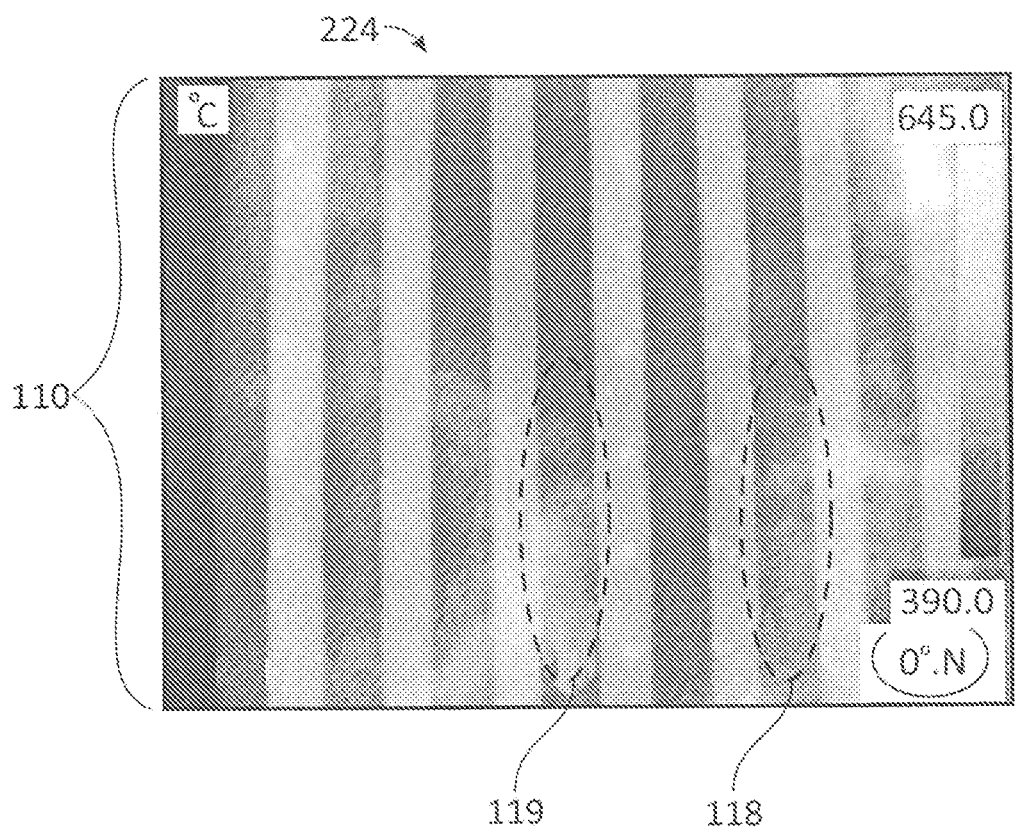

As will be further discussed herein, such problems can be avoided through application of various principles of the present disclosure. For example, FIG. 2E illustrates a processed thermal image 224 generated by applying a digital filter to stabilized versions of thermal images 220-223. In particular, the digital filter has assigned pixels of processed thermal image 224 with the minimum (e.g. the lowest) pixel values associated with corresponding pixels in thermal images 220-223.

For example, in thermal image 224, the pixels corresponding to surface 118 have been assigned pixel values from corresponding pixels of thermal images 220-223 where surface 118 is most viewable and exhibits lower pixel values (e.g., corresponding to lower temperature values). Also in thermal image 224, the pixels corresponding to surface 119 have been assigned pixel values from corresponding pixels of thermal images 220-223 where surface 119 is similarly viewable and exhibits lower pixel values. As a result, the temperatures of both surfaces 118 and 119 are viewable by the user in processed thermal image 224, despite the existence of highly turbulent gas 130 in the original thermal images 220-223.

The determination of actual temperatures of furnace tubes 110 is particularly important to reduce the risks of premature failures (e.g., due to cracks, ruptures, and/or other types of failures) caused by localized overheating of furnace tubes 110. In some cases, overheating may be caused by coking resulting from carbon buildup on internal surfaces of furnace tubes 110 which slows or otherwise impedes the flow of oil 111 through the area of buildup. This reduces the amount of heat usually drawn away from the furnace tube 110 by the normal flow of oil 111. As a result, the furnace tube 110 can become excessively heated in the area of buildup which causes the furnace tube surface temperature to increase above normal levels.

For example, FIG. 1 illustrates an area 114 in furnace tubes 110 that may be associated with coking, but is also obscured by higher temperature gas 130. As a result, conventional thermal imaging techniques may be unable to reliably detect the possible coking. However, by applying a digital filter in accordance with various embodiments disclosed herein, the actual furnace tube surface temperature of area 114 may be determined and the obscuring effects of gas 130 on temperature measurements may be reduced.

In other cases, underheating may be caused by scaling resulting from the formation of an oxide layer on external surfaces of furnace tubes 110 which limits heat transfer into furnace tubes 110. However, the external oxide layer itself may exhibit excessively high temperatures through heating of the scaled deposits while the scaled deposits simultaneously insulate the furnace tubes 110, thus resulting in low internal temperatures for the oil 111 in the furnace tubes 110. For example, FIG. 1 further illustrates an area 116 that may be associated with scaling. As further discussed herein, various techniques may be used to compare visible light images and thermal images captured of area 116 to determine whether the high temperatures associated with area 116 are associated with scaling or coking.

Figure 3:
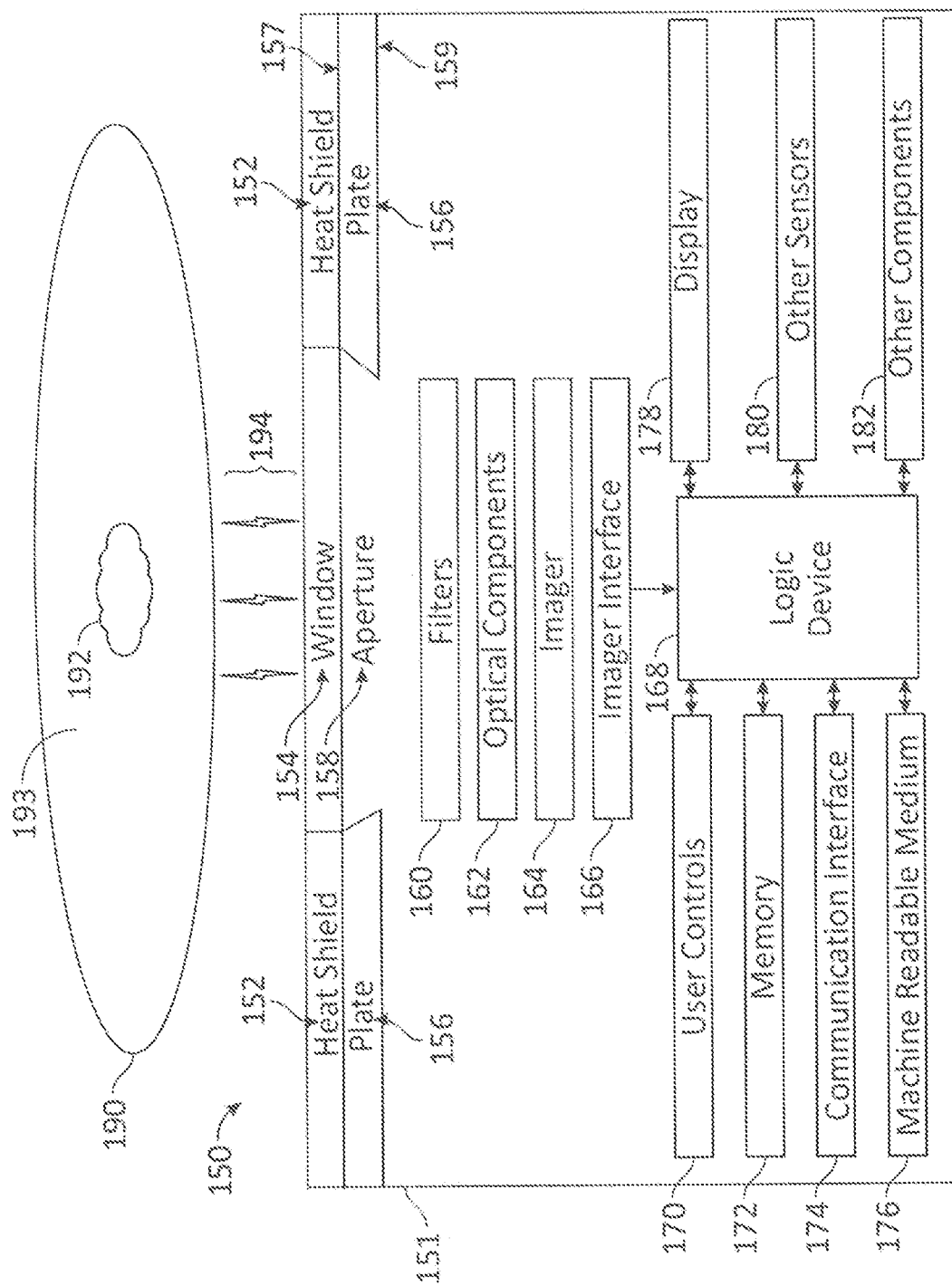
FIG. 3 illustrates a block diagram of an imaging system in accordance with an embodiment of the disclosure.

FIG. 3 illustrates a block diagram of imaging system 150 in accordance with an embodiment of the disclosure. As shown, imaging system 150 includes a housing 151 (e.g., a camera body), a heat shield 152, a protective window 154, a plate 156 having an aperture 158, one or more filters 160, one or more optical components 162, an imager 164, an imager interface 166, a logic device 168, user controls 170, a memory 172, a communication interface 174, a machine readable medium 176, a display 178, other sensors 180, and other components 182.

In various embodiments, imaging system 150 may be implemented, for example, as a camera system such as a portable handheld camera system, a small form factor camera system implemented as part of another device, a fixed camera system, and/or other appropriate implementations. Imaging system 150 may be positioned to receive infrared radiation 194 from a scene 190 (e.g., a field of view of imaging system 150). In various embodiments, scene 190 may include an interior portion of furnace 101 including tubes 110 (e.g., as shown in FIG. 1) and/or an inspection area with a possible gas leak 192 in front of a background portion 193 of scene 190 (e.g., as shown in FIG. 3).

Heat shield 152 may be provided to protect imaging system 150 when positioned in proximity to furnace 100. In some embodiments, protective window 154 may be provided in proximity to heat shield 152 to protect portions of imaging system 150 that might otherwise be exposed by heat shield 152. In some embodiments, protective window 154 may be implemented with appropriate material to filter out unwanted wavelengths.

Plate 156 may be provided with aperture 158 to reduce the amount of infrared radiation 194 passed through to imager 164 and may thus effectively operate as a neutral density filter. In addition, in some embodiments, plate 156 may include a coating (e.g., IR black) on its front side 157 and/or its back side 159 that absorbs infrared radiation 194 to reduce stray light of infrared radiation 194 from possibly being received by imager 164. In some embodiments, one or more additional filters 160 may be provided to selectively filter particular thermal wavelengths of interest for images to be captured by imager 164.

Optical components 162 (e.g., an optical assembly including one or more lenses, additional filters, transmissive windows, and/or other optical components) pass the filtered infrared radiation 194 for capture by imager 164.

Thus, it will be appreciated that protective window 154, plate 156, aperture 158, filters 160, and/or optical components 162 may operate together to selectively filter out portions of infrared radiation 194 such that only desired wavelengths and/or desired thermal radiation intensities are ultimately received by imager 164. In various embodiments, any desired combination of such components may be provided (e.g., various components may be included and/or omitted as appropriate for various implementations).

Imager 164 may be implemented as a thermal imager to capture thermal images of scene 190 in response to infrared radiation 194. Imager 164 may include an array of sensors for capturing thermal images (e.g., thermal image frames) of scene 190. In some embodiments, imager 164 may also include one or more analog-to-digital converters for converting analog signals captured by the sensors into digital data (e.g., pixel values) to provide the captured images. Imager interface 166 provides the captured images to logic device 168 which may be used to process the images, store the original and/or processed images in memory 172, and/or retrieve stored images from memory 172. Additional implementation details of an embodiment of imager 164 are further discussed herein with regard to FIG. 4.

Logic device 168 may include, for example, a microprocessor, a single-core processor, a multi-core processor, a microcontroller, a programmable logic device configured to perform processing operations, a digital signal processing (DSP) device, one or more memories for storing executable instructions (e.g., software, firmware, or other instructions), and/or any other appropriate combinations of devices and/or memory to perform any of the various operations described herein. Logic device 168 is configured to interface and communicate with the various components of imaging system 150 to perform various method and processing steps described herein. In various embodiments, processing instructions may be integrated in software and/or hardware as part of logic device 168, or code (e.g., software and/or configuration data) which may be stored in memory 172 and/or a machine readable medium 176. In various embodiments, the instructions stored in memory 172 and/or machine readable medium 176 permit logic device 168 to perform the various operations discussed herein and/or control various components of system 150 for such operations.

Memory 172 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, fixed memory, removable memory, and/or other types of memory.

Machine readable medium 176 (e.g., a memory, a hard drive, a compact disk, a digital video disk, or a flash memory) may be a non-transitory machine readable medium storing instructions for execution by logic device 168. In various embodiments, machine readable medium 176 may be included as part of imaging system 150 and/or separate from imaging system 150, with stored instructions provided to imaging system 150 by coupling the machine readable medium 176 to imaging system 150 and/or by imaging system 150 downloading (e.g., via a wired or wireless link) the instructions from the machine readable medium (e.g., containing the non-transitory information).

Logic device 168 may be configured to process captured images and provide them to display 178 for presentation to and viewing by the user. Display 178 may include a display device such as a liquid crystal display (LCD), an organic light-emitting diode (OLED) display, and/or other types of displays as appropriate to display images and/or information to the user of system 150. Logic device 168 may be configured to display images and information on display 178. For example, logic device 168 may be configured to retrieve images and information from memory 172 and provide images and information to display 178 for presentation to the user of system 150. Display 178 may include display electronics, which may be utilized by logic device 168 to display such images and information.

User controls 170 may include any desired type of user input and/or interface device having one or more user actuated components, such as one or more buttons, slide bars, knobs, keyboards, joysticks, and/or other types of controls that are configured to generate one or more user actuated input control signals. In some embodiments, user controls 170 may be integrated with display 178 as a touchscreen to operate as both user controls 170 and display 178. Logic device 168 may be configured to sense control input signals from user controls 170 and respond to sensed control input signals received therefrom. In some embodiments, portions of display 178 and/or user controls 170 may be implemented by appropriate portions of a tablet, a laptop computer, a desktop computer, and/or other types of devices.

In various embodiments, user controls 170 may be configured to include one or more other user-activated mechanisms to provide various other control operations of imaging system 150, such as auto-focus, menu enable and selection, field of view (FoV), brightness, contrast, gain, offset, spatial, temporal, and/or various other features and/or parameters.

Imaging system 150 may include various types of other sensors 180 including, for example, motion sensors (e.g., accelerometers, vibration sensors, gyroscopes and/or others), microphones, navigation sensors (e.g., global positioning system (GPS) sensors), temperature sensors, and/or other sensors as appropriate.

Logic device 168 may be configured to receive and pass images from imager interface 166, additional data from sensors 180, and control signal information from user controls 170 to one or more external devices through communication interface 174 (e.g., through wired and/or wireless communications). In this regard, communication interface 174 may be implemented to provide wired communication over a cable and/or wireless communication over an antenna. For example, communication interface 174 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication interface 174 may include an antenna coupled thereto for wireless communication purposes. In other embodiments, the communication interface 174 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 150 and/or its individual associated components may be associated with a particular network link such as for example a URL (Uniform Resource Locator), an IP (Internet Protocol) address, and/or a mobile phone number.

Imaging system 150 may include various other components 182 such as speakers, displays, visual indicators (e.g., recording indicators), vibration actuators, a battery or other power supply (e.g., rechargeable or otherwise), and/or additional components as appropriate for particular implementations.

Although various features of imaging system 150 are illustrated together in FIG. 3, any of the various illustrated components and subcomponents may be implemented in a distributed manner and used remotely from each other as appropriate.

Although imaging system 150 has been described in the context of a thermal imaging system, other embodiments are also contemplated. In some embodiments, protective window 154, aperture 158, filters 160, optical components 162, and/or imager 164 may be implemented to pass and capture other wavelengths such as visible light wavelengths in addition to or instead of thermal wavelengths. For example, imaging system 150 may be implemented to capture both thermal images and visible light images of scene 190 for comparison with each other to detect scaling or other phenomena. As another example, different imaging systems 150 implemented for different wavelengths may be used to capture thermal images and visible light images of scene 190.

Figure 4:
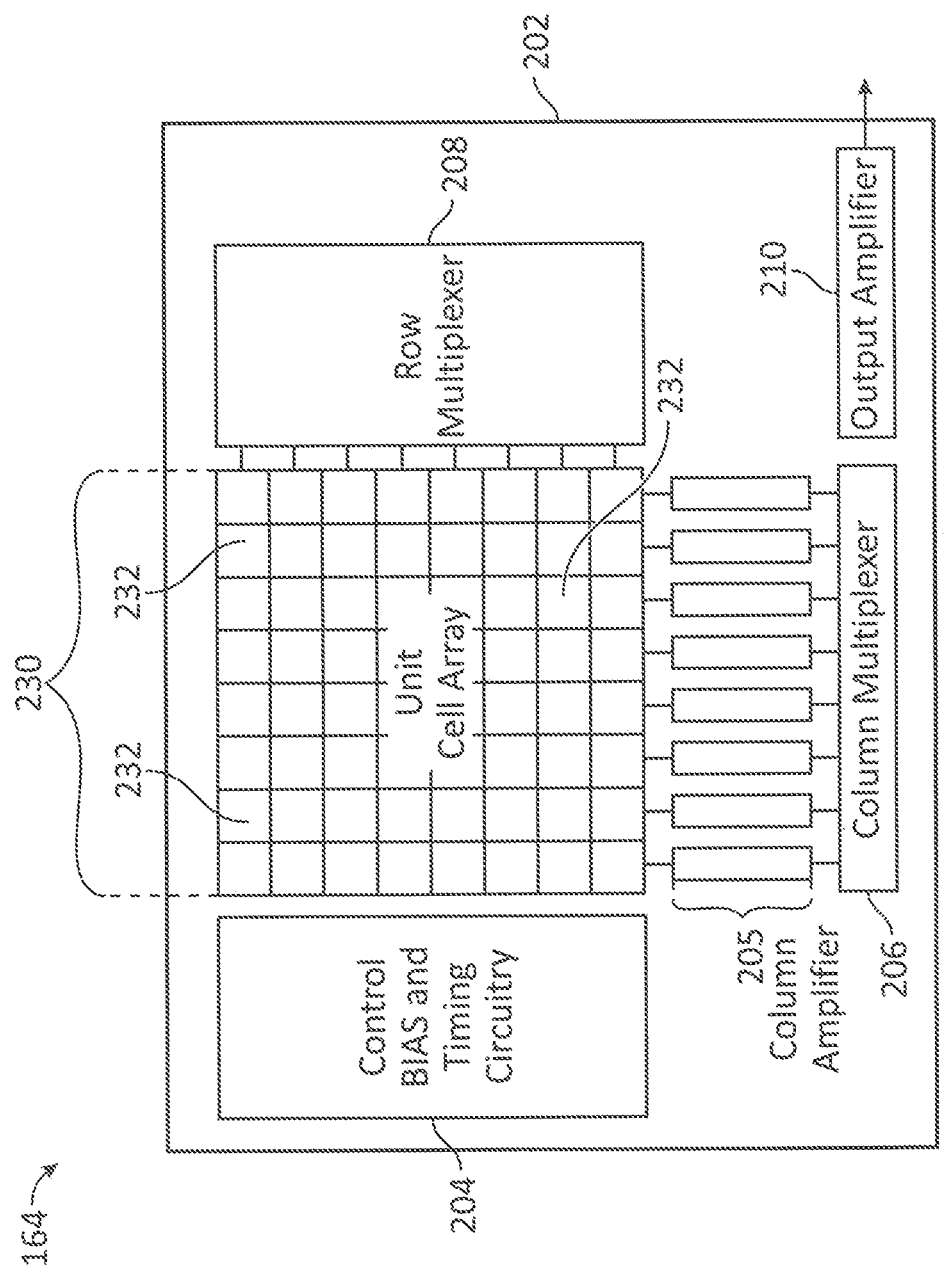
FIG. 4 illustrates a block diagram of an imager in accordance with an embodiment of the disclosure.

FIG. 4 illustrates a block diagram of imager 164 in accordance with an embodiment of the disclosure. In this illustrated embodiment, imager 164 is a focal plane array (FPA) including a sensor array 230 of infrared sensors 232 (e.g., implemented as unit cells) and a read out integrated circuit (ROIC) 202. Although an 8 by 8 array of infrared sensors 232 is shown (e.g., corresponding to rows and columns of pixels in associated pixels), this is merely for purposes of example and ease of illustration. Any desired sensor array size may be used as desired.

Each infrared sensor 232 may be implemented, for example, by an infrared detector such as a microbolometer and associated circuitry to provide image data (e.g., a data value associated with a captured voltage) for a pixel of a captured thermal image. In this regard, time-multiplexed electrical signals may be provided by the infrared sensors 232 to ROIC 202.

ROIC 202 includes bias generation and timing control circuitry 204, column amplifiers 205, a column multiplexer 206, a row multiplexer 208, and an output amplifier 210. Images captured by infrared sensors 232 may be provided by output amplifier 210 to logic device 168 and/or any other appropriate components to perform various processing techniques described herein. Further descriptions of ROICs and infrared sensors (e.g., microbolometer circuits) may be found in U.S. Pat. No. 6,028,309 issued Feb. 22, 2000, which is incorporated herein by reference in its entirety.

Figure 5:
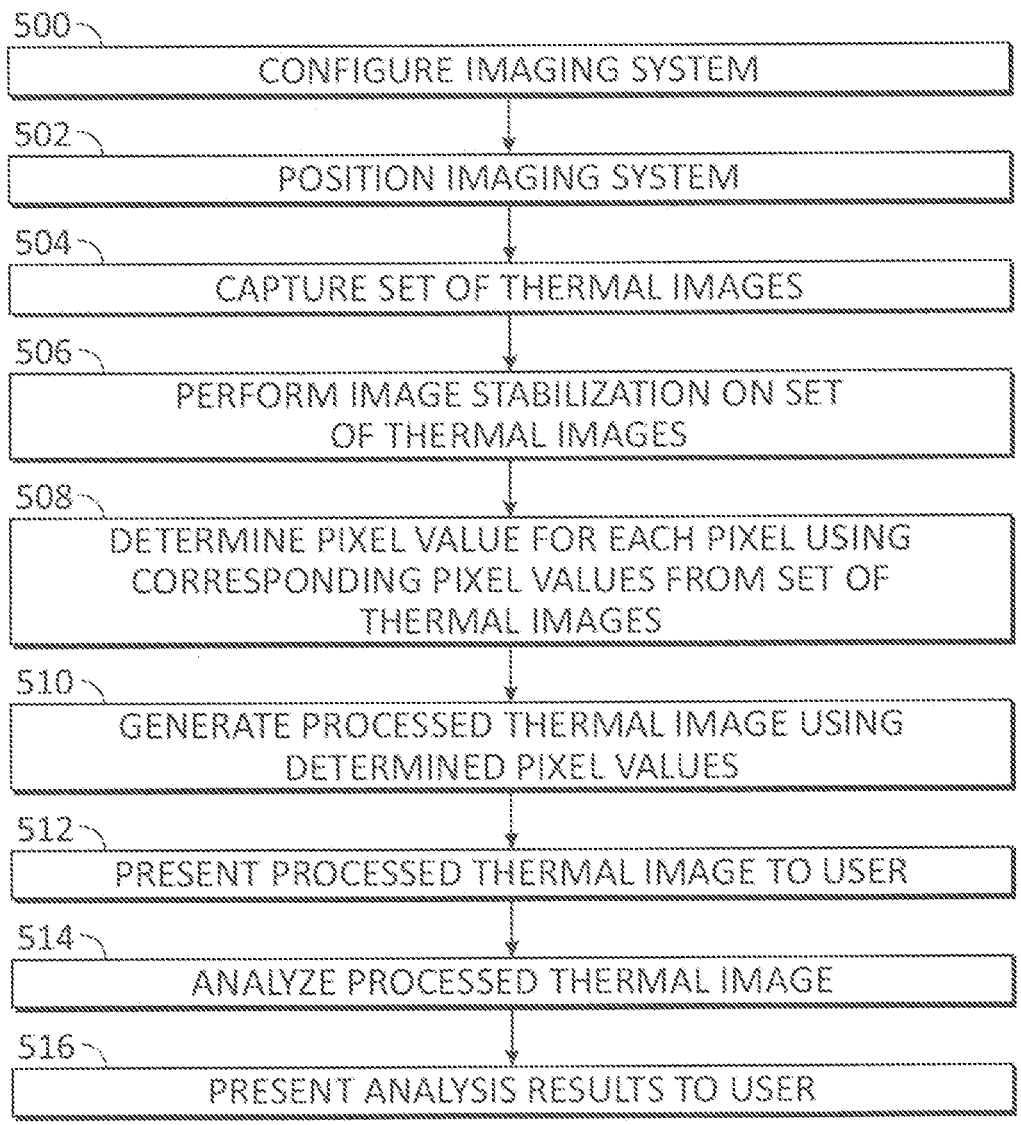
FIG. 5 illustrates a process of generating a processed thermal image in accordance with an embodiment of the disclosure.

FIG. 5 illustrates a process of generating a processed thermal image in accordance with an embodiment of the disclosure. In particular, imaging system 150 may be implemented in accordance with the various operations of FIG. 5 to provide improved temperature detection for furnace tubes 110, improved detection of gas leaks 192, and/or other types of detection. In various embodiments, the operations of FIG. 5 may be performed by imager 164, logic device 168, any of the various components of imaging system 150, and/or the user (e.g., an operator of imaging system 150, furnace 100, and/or other equipment).

In block 500, imaging system 150 is configured for operation. For example, in some embodiments, such configuration may be performed the user selecting various parameters or settings of imaging system 150 through appropriate manipulation of user controls 170, logic device 168 processing various images and/or data received from any of the various components of imaging system 150, and/or combinations of user selections and logic device 168 processing. In this regard, FIG. 6 illustrates a process of configuring an imaging system that may be performed in block 500 of FIG. 5 in accordance with an embodiment of the disclosure.

Figure 6:
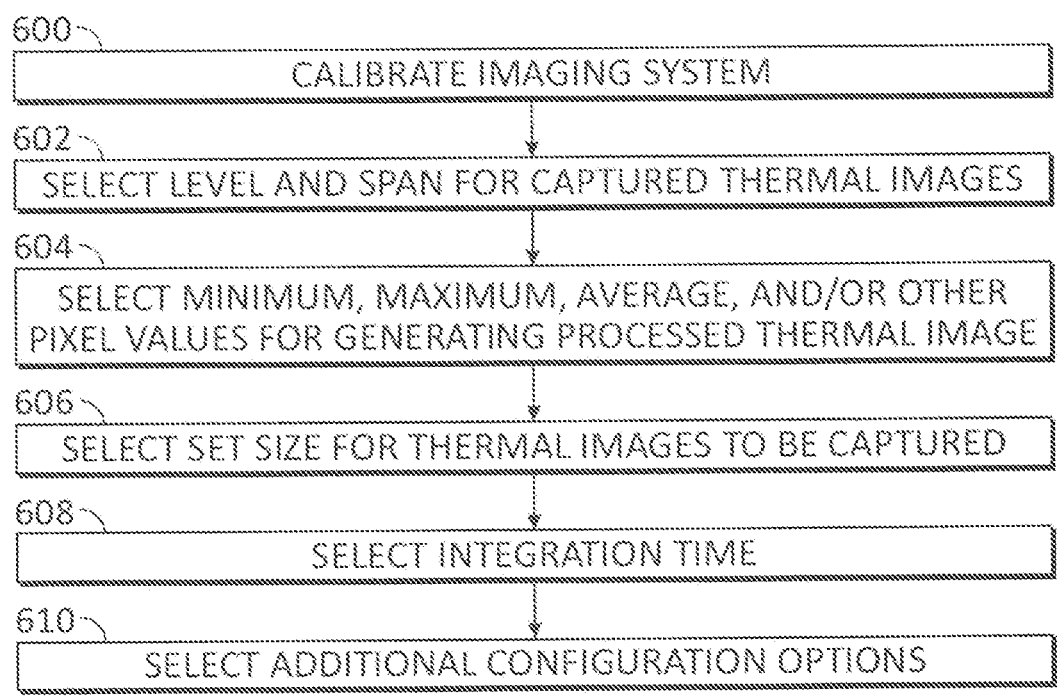
FIG. 6 illustrates a process of configuring an imaging system in accordance with an embodiment of the disclosure.

Referring now to FIG. 6, in block 600, imaging system 150 is calibrated. For example, in some embodiments, block 600 may include performing one or more non-uniformity correction processes to calibrate infrared sensors 232 of imager 164. In block 602, the level and span of thermal images to be captured by imager 164 are selected.

In block 604, the type of thermal image processing to be performed is selected. In some embodiments, a minimum value processed thermal image may be generated using the minimum pixel values corresponding to the lowest temperatures measured for corresponding pixels from a set of captured thermal images. Such a minimum value processed thermal image may be used to filter out hot gases 130 to reveal the temperatures of furnace tubes 130 when imaging system 150 is used for furnace monitoring or some gas leak detection implementations.

In some embodiments, a maximum value processed thermal image and/or an average value processed thermal image may be generated as appropriate using the maximum and/or average pixel values corresponding to the highest and/or average temperatures measured for corresponding pixels from a set of captured thermal images. Such maximum value or average value processed thermal images may be used for some gas leak detection implementations.

Other types of thermal image processing are also contemplated. For example, in some embodiments, pixel values higher and/or lower than a particular value may be selected to account for dominating radiation emissions associated with gases and/or particles.

In block 606, the size of the set of thermal images to be used to generate a processed thermal image is selected. In some embodiments, a particular number of thermal images (e.g., 150 images) may be identified for the set. In this case, a processed thermal image generated in the process of FIG. 5 may select minimum, maximum, and/or average pixel values from corresponding pixels selected from 150 thermal images. In some embodiments, a particular image capture period (e.g., a length of time) may be selected. If thermal images are captured at a rate of 30 images per second (e.g., 30 Hz), then selecting an image capture period of 5 seconds would also correspond to 150 thermal images. In some embodiments, the size of the set of thermal images may be selected by logic device 168 by processing preexisting sets of thermal images to determine an appropriate set size that provides temperature values of all or at least a desired portion of furnace tubes 110 in scene 190. In some embodiments, the size of the set of thermal images may be selected by the user based on their review of processed thermal images presented on display 178.

In block 608, a temperature range and/or an integration time is selected for imager 164. For example, when extremely hot scenes such as furnace 100 are imaged, a relatively short integration time may be desired when capturing each thermal image. Conversely, when cold scenes such as an exterior environment provided by scene 190 are imaged, a relatively long integration time may be desired when capturing each thermal image. In block 610, any additional configuration options for imaging system 150 may be selected as appropriate.

Returning to FIG. 5, after imaging system 150 is configured for operation, imaging system 150 is positioned in block 502 to capture thermal images. For example, imaging system 150 may be positioned in proximity to opening 104 of enclosure 101 for capturing thermal images of furnace 100. As another example, imaging system 150 may be positioned in proximity to an area corresponding to a suspected gas leak 192.

In block 504, imaging system 150 captures a set of thermal images in accordance with the setting provided in block 606 of FIG. 6. In this regard, imager 164 may capture a series of thermal images at various time intervals. Because the thermal images are captured sequentially and separated by time, turbulent gas 130 or a gas leak 192 will exhibit motion from image to image (e.g., frame to frame motion) as similarly discussed with regard to thermal images 220-223 of FIGS. 2A-2D. The captured thermal images may be stored by logic device 168, memory 172, and/or machine readable medium 176 for further processing.

In block 506, logic device 168 receives the set of captured thermal images and performs an image stabilization process on the set of captured thermal images to remove possible effects of blur or unintended motion of imaging system 150 that may be present in the captured thermal images. For example, imaging system 150 may experience significant vibration or other undesirable motion when positioned in proximity to the volatile environment of furnace 100. As a result of the image stabilization process performed in block 506, the pixels in the set of thermal images will consistently correspond to the same physical locations imaged in furnace 100 or scene 190. In some embodiments, block 506 may further include performing an image registration process to align the set of thermal images, for example, if different thermal images are captured using different coordinate systems (e.g., if multiple imaging systems 150 are used to capture thermal images from different points of view).

Although image stabilization is described in block 506, other techniques are also contemplated. For example, in some embodiments, the thermal images may be captured in block 504 at a high speed frame rate (e.g., greater than 100 Hz and using a small set of approximately the most recent 10 thermal images) and/or while the user holds steady a thermal camera containing imager 164. In these cases, the captured thermal images may not exhibit significant frame-to-frame translation and therefore may be compared with each other accurately without requiring image stabilization processing in block 506.

In some embodiments, logic device 168 may track frame-to-frame image movement in block 506 instead of performing image stabilization. In this regard, logic device 168 may keep track of which pixels of the captured thermal images correspond to various portions of the scene 190. In this case, the digital filter (further discussed herein) may be applied in block 508 dynamically based on the tracked pixels.

In block 508, logic device 168 applies a digital filter to the set of thermal images. The digital filter determines a value for each pixel using pixel values of the set of thermal images depending on the type of thermal image processing selected in block 604 as discussed. For example, in some embodiments, if imaging system 150 is used for monitoring tubes 110 of furnace 100 or an appropriate gas leak 192, then minimum pixel values may be selected. In this case, logic device 168 may review the pixel values corresponding to a particular pixel in the set of thermal images and select (e.g., identify) the minimum (e.g., the lowest) pixel value for that pixel. This can be repeated for all pixels until a minimum pixel value has been selected for each pixel. As a result, turbulent gas 130 may be effectively filtered out (e.g., removed) from the processed thermal image, to reveal the temperatures of furnace tubes 110. In the case of other types of thermal image processing, maximum pixel values and/or average pixel values may be selected for each pixel. In some embodiments, pixel values higher and/or lower than a particular value may be selected as discussed.

In block 510, logic device 168 generates a processed thermal image using the pixel values determined in block 508. For example, thermal image 224 of FIG. 2E is a minimum value processed thermal image generated from pixel values of a set of four captured thermal images 220-223.

In block 512, imaging system 150 presets the processed thermal image to the user, for example, by providing the processed thermal image on display 178. As a result, in the case of a minimum value processed thermal image of furnace tubes 110, the user may easily identify the actual temperatures of furnace tubes 110 without temperature abnormalities introduced by gas 130 as discussed. Similarly, in the case of a minimum, maximum, or average value processed thermal image of gas leak 192, the user may identify the location and/or contours of the gas leak 192 more accurately without temperature aberrations introduced by other features in background 193 (e.g., by limiting the processed thermal image to a range of temperatures associated with gas leak 192 and removing temperatures outside that range that are associated with other features).

In block 514, logic device 168 may perform additional analysis on the processed thermal image to identify temperature deviations that may be associated with potential problems. For example, in some embodiments, logic device 168 may perform image processing and/or other appropriate operations to identify portions of the processed thermal image that exhibit excessive temperatures. Because the effects of volatile hot gas 130 have been effectively removed from the processed thermal image, any remaining areas of excessive temperatures may correspond to potential coking or scaling (e.g., areas 114 or 116) associated with furnace tubes 110.

In some embodiments, visible light images of scene 190 may be captured prior to or during the process of FIG. 5 by an implementation of imaging system configured for capturing one or more visible light images as discussed. Logic device 168 may process the visible light images to identify possible areas of scaling (e.g., area 116). For example, in some embodiments of block 514, logic device 168 may compare the processed thermal image with the one or more visible light images to determine whether areas of excessive temperatures in the processed thermal image are associated with coking (e.g., area 114 having no corresponding features in the visible light images) or scaling (e.g., area 116 having visible scaling features in the visible light images corresponding to the same area 116 of excessive temperatures in the processed thermal image). As a result, the process of FIG. 5 may provide a comprehensive approach to identifying areas of temperature deviation and further identifying possible causes of such temperature deviation (e.g., coking or scaling).

In block 516, imaging system 150 presents the results of the analysis to the user, for example, by providing information to display 178 in the form of temperature data, a temperature alert (e.g., notifying the user of an overheated area), and/or other formats.

Although the process of FIG. 5 has been discussed in relation to generating a single processed thermal image, additional processed thermal images may be generated as appropriate. For example, in some embodiments, blocks 504 through 516 may be repeated to generate and analyze additional processed thermal images (e.g., updated processed thermal images) dynamically, for example, for real-time viewing by the user. In some embodiments, each processed thermal image may be generated by a new set of captured thermal images. In some embodiments, each processed thermal image may be generated using a sliding window of captured thermal images (e.g., when a new additional thermal image is captured, it is added to the existing set of thermal images and the oldest thermal image is discarded, thus permitting new processed thermal images to be generated using the most recent captured thermal images).

In some embodiments, portions of the process of FIG. 5 may be performed as a remote service. For example, in some embodiments, logic device 168 may be positioned remotely from imager 164 and/or display 178, and may receive captured thermal images for processing, for example, over a network and/or at a later time. Thus, logic device 168 may process the set of thermal images and provide the processed thermal image and/or analysis results to the user (e.g., to display 178) over a network and/or at a later time after the thermal images are captured.

In view of the present disclosure, it will be appreciated that accurate temperature measurements may be determined even in chaotic environments where turbulent gases are present such as the interior portions of hot furnaces. Moreover, the various techniques provided herein may also be used to more accurately and dynamically visualize potential gas leaks and/or other phenomena of interest by reducing the effects of extraneous variations in temperature caused by other environmental factors.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   receiving a plurality of thermal images captured of a scene comprising a furnace tube and combustion gas exhibiting a higher temperature than the furnace tube, wherein each thermal image comprises a plurality of pixels each having an associated pixel value; and
   applying a digital filter to the thermal images to generate a processed thermal image, wherein each pixel of the processed thermal image has an associated minimum pixel value determined from corresponding pixels of the thermal images to remove the higher temperature combustion gas from the processed thermal image.

2. The method of claim 1, wherein the combustion gas exhibits varying positions and obscures portions of the furnace tube in the thermal images.

3. The method of claim 1, further comprising analyzing the processed thermal image to detect areas of the furnace tubes associated with coking.

4. The method of claim 1, further comprising comparing the processed thermal image with a visible light image of the scene to detect areas of the furnace tubes associated with scaling.

5. The method of claim 1, further comprising performing an image stabilization process and/or an image tracking process on the captured thermal images before applying the digital filter.

6. The method of claim 1, wherein the scene comprises an inspection area associated with a gas leak, wherein the applying comprises:
   selecting, for each pixel of the processed thermal image, a minimum pixel value, a maximum pixel value, and/or an average pixel value associated with the corresponding pixels of the thermal images; and
   generating the processed thermal image using the selected pixel values to remove temperatures outside a temperature range associated with the gas leak to visualize and/or track the gas leak.

7. The method of claim 1, further comprising:
   generating updated processed thermal images using additional captured thermal images; and
   presenting the updated processed thermal images to a user for realtime viewing.

8. The method of claim 1, wherein the thermal images comprise a set of thermal images, the method further comprising selecting a size of the set of thermal images to be used for generating the processed thermal image.

9. The method of claim 1, wherein the method is performed by a thermal imaging camera.

10. The method of claim 1, wherein the method is performed by a networked logic device remote to a thermal imager configured to capture the thermal images.

11. A system comprising:
   a thermal imager configured to capture a plurality of thermal images of a scene comprising a furnace tube and combustion gas exhibiting a higher temperature than the furnace tube, wherein each thermal image comprises a plurality of pixels each having an associated pixel value; and
   a logic device configured to:
      apply a digital filter to the thermal images to generate a processed thermal image, wherein each pixel of the processed thermal image has an associated minimum pixel value determined from corresponding pixels of the thermal images to remove the higher temperature combustion gas from the processed thermal image.

12. The system of claim 11, wherein the combustion gas exhibits varying positions and obscures different portions of the furnace tube in the thermal images.

13. The system of claim 11, wherein the logic device is configured to analyze the processed thermal image to detect areas of the furnace tubes associated with coking.

14. The system of claim 11, wherein the logic device is configured to compare the processed thermal image with a visible light image of the scene to detect areas of the furnace tubes associated with scaling.

15. The system of claim 11, wherein the logic device is configured to perform an image stabilization process and/or an image tracking process on the captured thermal images before applying the digital filter.

16. The system of claim 11, wherein the scene comprises an inspection area associated with a gas leak, wherein the logic device is configured to perform the following to apply the digital filter:
   select, for each pixel of the processed thermal image, a minimum pixel value, a maximum pixel value, and/or an average pixel value associated with the corresponding pixels of the thermal images; and
   generate the processed thermal image using the selected pixel values to remove temperatures outside a temperature range associated with the gas leak to visualize and/or track the gas leak.

17. The system of claim 11, wherein the logic device is configured to:
   generate updated processed thermal images using additional captured thermal images; and
   present the updated processed thermal images to a user for realtime viewing.

18. The system of claim 11, wherein the thermal images comprise a set of thermal images, wherein the logic device is configured to select a size of the set of thermal images to be used for generating the processed thermal image.

19. The system of claim 11, wherein the system is a thermal imaging camera.

20. The system of claim 11, wherein the logic device is a networked logic device remote to the thermal imager.

* * * * *